(12) United States Patent
Datz et al.

(10) Patent No.: US 11,891,936 B2
(45) Date of Patent: Feb. 6, 2024

(54) EXHAUST GAS TREATMENT ARRANGEMENT FOR AN EXHAUST GAS SYSTEM OF AN INTERNAL COMBUSTION ENGINE

(71) Applicant: Purem GmbH, Neunkirchen (DE)

(72) Inventors: Wolfgang Datz, Tuebingen (DE); Arthur Wieland, Baltmannsweiler (DE); Konstantin Kappes, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 18 days.

(21) Appl. No.: 17/668,162

(22) Filed: Feb. 9, 2022

(65) Prior Publication Data

US 2022/0268194 A1 Aug. 25, 2022

(30) Foreign Application Priority Data

Feb. 10, 2021 (DE) ...................... 10 2021 103 060.9

(51) Int. Cl.
*F01N 3/20* (2006.01)
*F01N 3/28* (2006.01)

(52) U.S. Cl.
CPC ......... *F01N 3/2053* (2013.01); *F01N 3/2066* (2013.01); *F01N 3/2892* (2013.01); *F01N 2240/36* (2013.01); *F01N 2610/02* (2013.01)

(58) Field of Classification Search
CPC ............ F01N 2240/36; F01N 2610/02; F01N 3/2053; F01N 3/2066; F01N 3/2892

(Continued)

(56) References Cited

U.S. PATENT DOCUMENTS

| 2006/0191255 A1* | 8/2006 | Olofsson ................. F01N 3/035 60/297 |
| 2009/0133390 A1 | 5/2009 | Knollmayr et al. |

(Continued)

FOREIGN PATENT DOCUMENTS

| DE | 103 29 436 A1 | 1/2005 |
| DE | 10 2009 053 949 A1 | 5/2011 |

(Continued)

OTHER PUBLICATIONS

English translation of the first Chinese Office action dated Jun. 27, 2023 in corresponding Chinese patent application 202210119745.4.

*Primary Examiner* — Kenneth J Hansen
*Assistant Examiner* — Kelsey L Stanek
(74) *Attorney, Agent, or Firm* — Walter Ottesen, P.A.

(57) ABSTRACT

An exhaust gas treatment arrangement for an exhaust gas system of an internal combustion engine includes a first exhaust gas flow path leading from an exhaust gas inlet provided on a housing to an exhaust gas outlet provided on the housing and a second exhaust gas flow path leading from the exhaust gas inlet to the exhaust gas outlet. The second exhaust gas flow path is separate from the first exhaust gas flow path. A flow path switching unit changes the exhaust gas stream parts, which are conducted in the first exhaust gas flow path and the second exhaust gas flow path. A reactant supply device supplies reactant into the second exhaust gas flow path downstream of the exhaust gas inlet and an SCR catalyst arrangement is provided in the second exhaust gas flow path upstream of the exhaust gas outlet.

19 Claims, 5 Drawing Sheets

(58) Field of Classification Search
USPC .......................................................... 60/288
See application file for complete search history.

(56) References Cited

U.S. PATENT DOCUMENTS

| | | | | |
|---|---|---|---|---|
| 2013/0202507 A1* | 8/2013 | Echoff | ................. | F01N 3/0871 |
| | | | | 422/119 |
| 2014/0102083 A1 | 4/2014 | Baetge et al. | | |
| 2015/0089931 A1* | 4/2015 | Werni | ................ | F01N 13/0097 |
| | | | | 422/119 |
| 2016/0298516 A1* | 10/2016 | Tomita | ................ | F01N 13/1805 |
| 2020/0040789 A1* | 2/2020 | Kobayashi | ............ | F01N 3/2053 |

FOREIGN PATENT DOCUMENTS

| | | |
|---|---|---|
| DE | 10 2018 132 833 A1 | 6/2020 |
| DE | 10 2019 203 938 A1 | 6/2020 |
| JP | 2017504751 A | 2/2017 |
| WO | 2004/090295 A1 | 10/2004 |

\* cited by examiner

EXHAUST GAS TREATMENT ARRANGEMENT FOR AN EXHAUST GAS SYSTEM OF AN INTERNAL COMBUSTION ENGINE

CROSS REFERENCE TO RELATED APPLICATION

This application claims priority of German patent application no. 10 2021 103 060.9, filed Feb. 10, 2021, the entire content of which is incorporated herein by reference.

TECHNICAL FIELD

The present disclosure concerns an exhaust gas treatment arrangement which may be used in an exhaust gas system of an internal combustion engine, in particular in a vehicle, in order to subject the exhaust gas emitted by the internal combustion engine to an exhaust gas cleaning process.

BACKGROUND

In order to reduce the pollutant content in the exhaust gas emitted by an internal combustion engine, it is known to use various exhaust gas treatment units, such as for example catalytic converters and particle filters. For example, in connection with diesel internal combustion engines, it is known to use SCR catalysts in order to reduce the nitrogen oxide proportion in the exhaust gas.

SUMMARY

It is an object of the present disclosure to provide an exhaust gas treatment arrangement for an exhaust gas system of an internal combustion engine which, with compact construction, can be adapted better to different operating states.

According to the disclosure, this object can, for example, be achieved with an exhaust gas treatment arrangement for an exhaust gas system of an internal combustion engine. This exhaust gas treatment arrangement includes: a first exhaust gas flow path leading from an exhaust gas inlet provided on a housing to an exhaust gas outlet provided on the housing; a second exhaust gas flow path leading from the exhaust gas inlet to the exhaust gas outlet and separate from the first exhaust gas flow path; a flow path switching unit for changing the exhaust gas stream parts, which are conducted in the first exhaust gas flow path and the second exhaust gas flow path, of an exhaust gas stream flowing through the exhaust gas inlet; a reactant supply device for supplying reactant into the second exhaust gas flow path downstream of the exhaust gas inlet; and, an SCR catalyst arrangement in the second exhaust gas flow path upstream of the exhaust gas outlet.

Because of the optional switching between the two exhaust gas flow paths, that is, changing the parts, conducted through the two exhaust gas flow paths, of the exhaust gas stream entering the exhaust gas treatment arrangement in the region of the exhaust gas inlet, it is possible to conduct the exhaust gas stream substantially completely or partially through the SCR catalyst arrangement or conduct this substantially completely or partially through the first exhaust gas flow path and hence bypass the SCR catalyst arrangement.

The gas stream thus flows through the SCR catalyst arrangement only when and to such an extent as necessary or desirable because of the respective operating state or pollutant level in the exhaust gas. If treatment of the exhaust gas in the SCR catalyst arrangement is not necessary, or in an operating state in which the SCR catalyst arrangement would only have low efficiency, for example, because of the exhaust gas composition or too low a temperature, the exhaust gas stream may bypass the SCR catalyst arrangement, so that a state with significantly reduced flow resistance is achieved in the exhaust gas treatment arrangement, which contributes to reducing the fuel consumption of an internal combustion engine and hence also to reducing the pollutant emissions.

In order to be able to provide a combined exhaust gas stream with the above-mentioned adjustability of the part of the exhaust gas stream conducted through the SCR catalyst arrangement, it is proposed that the first exhaust gas flow path and the second exhaust gas flow path merge in a flow path merging region upstream of the exhaust gas outlet, and the SCR catalyst arrangement is arranged in the second exhaust gas flow path upstream of the flow path merging region.

In an embodiment which is simple to implement, the division of the exhaust gas stream, entering at the exhaust gas inlet, into the parts flowing through the two exhaust gas flow paths may be achieved in that the first exhaust gas flow path and the second exhaust gas flow path are separated from one another in a flow path separating region downstream of the exhaust gas inlet, and the flow path switching unit is arranged downstream of the flow path separating region in the first exhaust gas flow path.

The flow path switching unit may include a throttle valve, wherein the throttle valve in a closed position blocks the first exhaust gas flow path maximally, preferably substantially completely, against through-flow and in an open position opens the first exhaust gas flow path maximally for through-flow. Such throttle valves for exhaust gas systems are known in the prior art as reliable system regions which are simple to actuate, and in the context of the embodiment of an exhaust gas treatment arrangement according to the disclosure, also allow division or switching of the exhaust gas stream in a simple fashion.

With such an embodiment or positioning of the flow path switching unit, in order to ensure that when the first exhaust gas flow path is opened, in particular maximally open, substantially the entire exhaust gas stream is conducted through this first exhaust gas flow path, it is furthermore proposed that a flow resistance of the first exhaust gas flow path is lower than a flow resistance of the second exhaust gas flow path. If the flow path switching unit is in a state in which the first exhaust gas flow path is maximally opened, then purely because of the greater flow resistance in the second exhaust gas flow path, the exhaust gas will flow primarily through the first exhaust gas flow path. By adjusting the flow path switching unit in the direction of its closed position, the resistance introduced by the flow path switching unit and hence the flow resistance in the first exhaust gas flow path are increased, so that depending on the flow resistance conditions in the two exhaust gas flow paths, a corresponding division of the exhaust gas stream over the two exhaust gas flow paths can be achieved.

For a defined positioning of the various system regions of the exhaust gas treatment arrangement firstly, and for a defined flow guidance in the housing secondly, a housing interior may be divided by a partition wall into a first volume region and a second volume region, and the second volume region may form at least a part of the first exhaust gas flow path. This means that exhaust gas flows directly through the second volume region, and hence the walls surrounding the second volume region, such as for example the partition wall, are also the walls guiding the exhaust gas stream flowing through the second volume region.

In a particularly advantageous embodiment variant, it is proposed that the SCR catalyst arrangement is substantially arranged in the second volume region. This is in particular advantageous if the second volume region provides part of the first exhaust gas flow path, and hence exhaust gas flowing into the first exhaust gas flow path flows through this region. This exhaust gas then also flows around the portion of the SCR catalyst arrangement lying in the second volume region, so that the exhaust gas can transmit heat to the SCR catalyst arrangement which, during operation of an internal combustion engine, is held constantly at a temperature suitable for performance of the catalytic exhaust gas cleaning reaction, or can be brought rapidly to such a temperature at the start of combustion operation of an internal combustion engine.

In order to be able to use the second volume region for through-flow of exhaust gas, the first exhaust gas flow path may include a preferably tubular first exhaust gas guide element.

In order to provide an as small as possible flow resistance of the first exhaust gas flow path, it is proposed that exhaust gas can flow substantially rectilinearly through a portion of the first exhaust gas flow path leading from the exhaust gas inlet to the second volume region. Thus the exhaust gas conducted into the first exhaust gas flow path can be conducted through this portion of the first exhaust gas flow path and enter the second volume region substantially without flow deflection.

The throttle valve may be arranged in the first exhaust gas guide element so that the first exhaust gas guide element may provide a valve tube of the throttle valve.

For a compact configuration of the exhaust gas treatment arrangement, the second exhaust gas flow path may include:
- a preferably housing-like second exhaust gas guide element which is substantially arranged in the first volume region,
- an exhaust gas/reactant mixing line adjoining or connecting to the second exhaust gas guide element and having a mixer which is arranged substantially in a preferably tubular third exhaust gas guide element adjoining or connecting to the second exhaust gas guide element,
- a preferably tubular fourth exhaust gas guide element adjoining or connecting to the third exhaust gas guide element and extending substantially in the second volume region,
- a preferably housing-like fifth exhaust gas guide element adjoining or connecting to the fourth exhaust gas guide element and extending substantially in the first volume region,
- a preferably tubular sixth exhaust gas guide element adjoining or connecting to the fifth exhaust gas guide element, extending substantially in the second volume region and containing a catalyst element of the SCR catalyst arrangement.

It is pointed out here that one or more of the exhaust gas guide elements may be constructed from one part or piece, which is simple to implement above all with the tubular configuration of the respective exhaust gas guide element. Alternatively, it is possible that one or more of the exhaust gas guide elements are composed of several parts, which is advantageous above all for a housing-like configuration of a respective exhaust gas guide element. For example, such an exhaust gas guide element may then be constructed from two or more interconnected housing shells. Furthermore, for example two or more mutually adjoining or connected exhaust gas guide elements, in particular with tubular configuration, may be provided by a single component in which the respective exhaust gas guide elements provide different component portions.

With the exhaust gas treatment arrangement according to the disclosure, for a compact construction it may furthermore be provided that the exhaust gas inlet is provided on the second exhaust gas guide element, and/or the second exhaust gas guide element is carried on the partition wall in a connecting region connected to the third exhaust gas guide element, and/or the third exhaust gas guide element extends substantially in the second volume region, and/or a main exhaust gas flow direction in the second exhaust gas guide element is substantially orthogonal to a main exhaust gas flow direction in the exhaust gas inlet.

A compact structure is furthermore supported if the second exhaust gas flow path is not open to the first volume region, and/or the second exhaust gas guide element and the fifth exhaust gas guide element are arranged next to one another in the first volume region, and a main exhaust gas flow direction in the second exhaust gas guide element is approximately parallel to a main exhaust gas flow direction in the fifth exhaust gas guide element. In this context, it should be pointed out that with a configuration of the second exhaust gas flow path in which this is not open to the first volume region, the second exhaust gas flow path may for example be guided through the first volume region by various of the above-mentioned exhaust gas guide elements, wherein the walls delimiting the first volume region towards the outside do not however serve to conduct the exhaust gas stream flowing through the second exhaust gas flow path.

To connect the first exhaust gas flow path to the second exhaust gas guide element, the first exhaust gas flow path may include a preferably hopper-like seventh exhaust gas guide element adjoining or connected to the second exhaust gas guide element and leading to the first exhaust gas guide element.

The second exhaust gas guide element may have a first outlet opening, wherein the third exhaust gas guide element adjoins the second exhaust gas guide element in the region of the first outlet opening. Furthermore, the second exhaust gas guide element may have a second outlet opening, wherein the seventh exhaust gas guide element adjoins the second exhaust gas guide element in the region of the second outlet opening.

In order to merge the exhaust gas flow paths, the flow path merging region may include an exhaust gas stream merging element following the sixth exhaust gas guide element, and the exhaust gas stream merging element may be open to the second volume region via at least one, preferably a plurality of passage openings, and/or the exhaust gas outlet may be provided in the region of the exhaust gas stream merging element.

The disclosure furthermore concerns an exhaust gas system for an internal combustion engine in a vehicle, including an exhaust gas treatment arrangement constructed according to the disclosure, and an exhaust gas treatment system adjoining the exhaust gas outlet of the exhaust gas treatment arrangement and having at least one exhaust gas treatment unit.

In such an exhaust gas system, the exhaust gas treatment arrangement constructed according to the disclosure is an upstream system region which is followed by a further system region contributing to exhaust gas treatment and hence to reducing the pollutant content in the exhaust gas, and having at least one exhaust gas treatment unit such as for example a catalytic converter or particle filter.

BRIEF DESCRIPTION OF THE DRAWINGS

The invention will now be described with reference to the drawings wherein.

DESCRIPTION OF THE PREFERRED EMBODIMENTS

Figure 3:
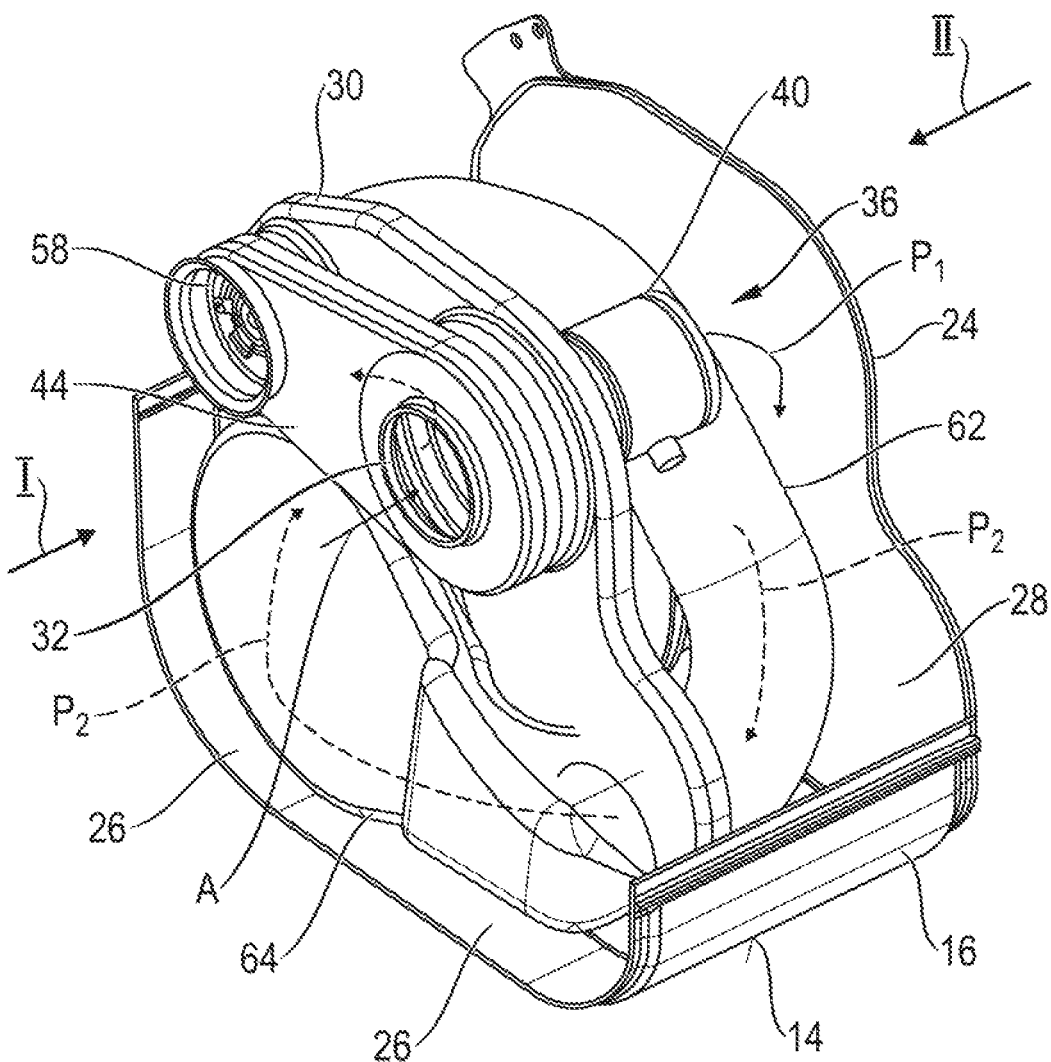
FIG. 3 is a further perspective view of the exhaust gas treatment arrangement with housing shown open.

In the figures, an exhaust gas treatment arrangement to be arranged in an exhaust gas system 10 of an internal combustion engine is generally designated 12. The exhaust gas treatment arrangement 12 includes a housing 14 with, in the embodiment depicted, a peripheral wall 20 constructed from two housing shells 16, 18, an end wall 22 on the inlet side (shown in FIGS. 4 and 5), an end wall 24 on the outlet side (shown in FIGS. 3, 4 and 5), and a partition wall 30 dividing an interior of the housing 14 into an upstream first volume region 26 and a downstream second volume region 28. The two housing shells 16, 18, the end walls 22, 24, and the partition wall 30 are preferably made of sheet metal material and fixedly connected together in mutually adjoining regions by material bonding, such as, for example, welding or soldering, and/or by form fit.

In the interior of the housing 14, two exhaust gas flow paths (to be explained below) are defined between an exhaust gas inlet 32 and an exhaust gas outlet 34. The or a part of the exhaust gas stream A introduced into the housing 14 in the region of the exhaust gas inlet 32 can flow through each of the exhaust gas flow paths. In the figures, the exhaust gas stream or part of the exhaust gas stream flowing through the first exhaust gas flow path is shown with solid lines, designated with flow arrows $P_1$, while the exhaust gas stream or part of the exhaust gas stream flowing through the second exhaust gas flow path is represented with dotted lines, designated with flow arrows $P_2$.

The exhaust gas treatment arrangement 12 includes a flow path switching unit, generally designated 36, for switching or dividing the exhaust gas stream A between the exhaust gas flow paths or into the two exhaust gas flow paths. The flow path switching unit 36 includes a throttle valve 38, shown in the open position in FIG. 2, in a tubular first exhaust gas guide element 40 which provides a valve tube on which the throttle valve 38 is carried so as to be pivotable about a pivot axis. A, for example, electric-motorized pivot drive (not shown) is assigned to the throttle valve 38 in order to pivot this throttle valve between the open position shown in FIG. 2, in which the first exhaust gas guide element 40 is open substantially to a maximum for through-flow, and for example a closed position in which the throttle valve 38 closes the first exhaust gas guide element 40 to a maximum, for example, substantially completely, against through-flow. In intermediate positions between the open position with maximal through-flow and the closed position with minimal through-flow, the first exhaust gas flow path 42 leading through the first flow guide element 40 is partially but not completely blocked against through-flow by the throttle element 38.

Upstream of the tubular first flow guide element 40, which is positioned substantially completely in the second volume region 28, a housing-like second exhaust gas guide element 44, which is constructed for example with two shell-like housing parts, is arranged in the first volume region 26. The second exhaust gas guide element 44 has an inlet opening 46 which is positioned in the region of or provides the exhaust gas inlet 32 formed on the end wall 22, for example, is fixed to the end wall 22, so that the exhaust gas stream flowing through the exhaust gas inlet 32 enters the housing-like second exhaust gas guide element 44 in the region of the inlet opening 46.

In a volume region of the second exhaust gas guide element 44 following the inlet opening 46, a flow path separating region 48 is formed in which the first exhaust gas flow path 42 leading to the first exhaust gas guide element 40, and the second exhaust gas flow path 50 leading through the second exhaust gas guide element 44, are separated.

In the interior of the second exhaust gas guide element 44, the exhaust gas stream A, or the part of the exhaust gas stream A which is conducted into the second exhaust gas flow path 50, flows substantially orthogonally to the main exhaust gas flow direction of the exhaust gas stream A at the exhaust gas inlet 32 and reaches a first outlet opening 52 of the second exhaust gas guide element 44. In the region of the first outlet opening 52, the second exhaust gas guide element 44 connects to a tubular third exhaust gas guide element 54, in which substantially a mixing line is formed for mixing the part of the exhaust gas stream A flowing through the second exhaust gas flow path 50 with a reactant R supplied by means of a reactant supply arrangement 56, generally also known as an injector. For this, a mixer 60 is carried on a carrier 58, also carrying the reactant supply arrangement 56, wherein exhaust gas and reactant R flow through the mixer and thus a turbulence is generated which supports the mixing.

The mixture of exhaust gas reactant R, for example a urea/water solution supplied in the form of a spray mist by the reactant supply arrangement 56, flows out of the third exhaust gas guide element 54, which is carried together with the second exhaust gas guide element 44 on the partition wall 30 and extends substantially in the second volume region 28, into a curved tubular fourth exhaust gas guide element 62. This leads in a bend through the second volume region 28 and, in the region of the partition wall 30, connects to a housing-like fifth exhaust gas guide element 64. The fifth exhaust gas guide element 64 may also be constructed with two housing shells, and like the second exhaust gas guide element 44, conducts the part of the exhaust gas stream A flowing through the second exhaust gas flow path 50 through the first volume region 26, wherein in in this region too, the second exhaust gas flow path 50 is not open to the first volume region 26.

Figure 1:
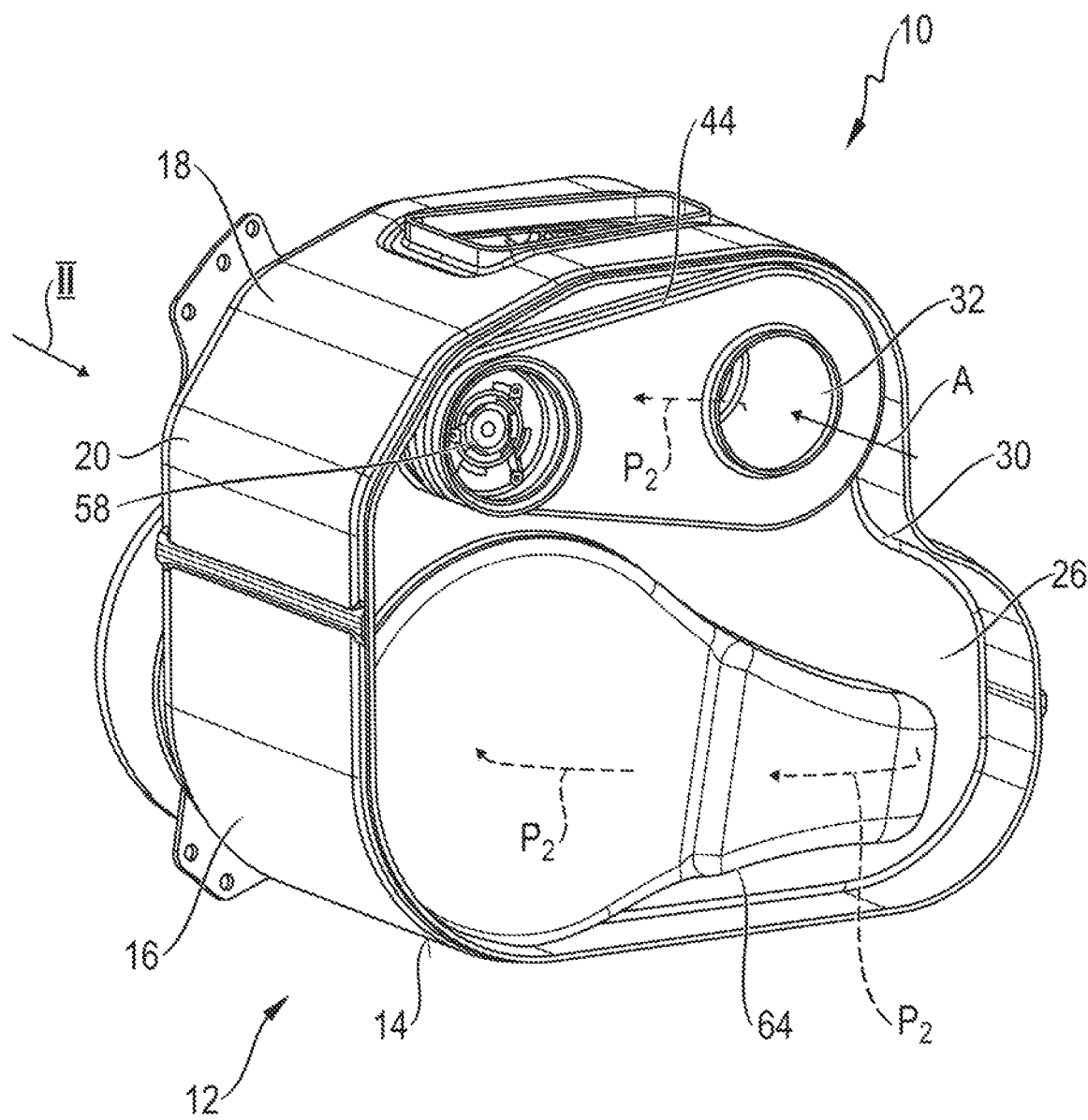
FIG. 1 is a perspective view of an exhaust gas treatment arrangement in an exhaust gas system of an internal combustion engine, considered in viewing direction I.

FIG. 1 clearly shows that the housing-like second exhaust gas guide element 44, and the housing-like fifth exhaust gas guide element 64 are positioned lying substantially next to one another in the first volume region 26, and the part of the exhaust gas stream A flowing along the second exhaust gas flow path 50 flows through these two elements substantially in parallel.

In the region of the partition wall 30, the fifth exhaust gas guide element 64 connects to a tubular sixth exhaust gas guide element 66. The latter is connected to the fifth exhaust gas guide element 64 for example in the region of the partition wall 30, and is fixedly carried therewith on the partition wall 30. The sixth exhaust gas guide element 66 may form a casing of an SCR catalyst arrangement, generally designated 68. A catalyst element 70 of the SCR catalyst arrangement 68 is carried in the tubular sixth exhaust gas guide element 66, for example with the interposition of a fiber mat 72. The catalyst element 70 may include a, for example, monolithic, porous body through which exhaust gas can flow, and which is made of and/or coated with catalytically active material. Alternatively, a complete catalyst arrangement with casing and catalyst element may be inserted in the tubular sixth exhaust gas guide element 66, so that if necessary the entire SCR catalyst arrangement 68 can be removed from the sixth exhaust gas guide element 66.

The sixth exhaust gas guide element 66 or the SCR catalyst arrangement 68 including this or inserted therein lies substantially completely in the second volume region 28, so that the part of the exhaust gas stream A entering the second volume region 28 via the first exhaust gas guide element 40, and flowing through this region, can flow around the outside of the SCR catalyst arrangement 68.

The sixth exhaust gas guide element 66 connects to a tubular exhaust gas stream merging element 74, which in the present embodiment is configured as a hopper. The exhaust gas stream leaving the SCR catalyst arrangement 68 or catalyst element 70 enters this exhaust gas stream merging element 74. The exhaust gas stream merging element has a plurality of passage openings 76, via which the interior of the exhaust gas stream merging element 74 is open towards the second volume region 28, so that exhaust gas flowing through the second volume region 28 can enter the exhaust gas stream merging element 74 via the passage openings 76.

A flow path merging region 78 is formed in the exhaust gas stream merging element 74, in which the two exhaust gas flow paths 42, 50 merge again and which leads to or provides the exhaust gas outlet 34 formed in the region of the end wall 24. The exhaust gas stream A, leaving the exhaust gas treatment arrangement 12 at the exhaust gas outlet 34, may flow to a further exhaust gas treatment system 80 adjoining or connecting to the exhaust gas outlet 34, in which the or a further treatment of the exhaust gas may be carried out in order to reduce the pollutant content. For example, this exhaust gas treatment system may include one or more exhaust gas treatment units 82, such as, for example, an oxidation catalytic converter, in particular a diesel oxidation catalytic converter, a particle filter, in particular a diesel particulate filter, or similar.

In order to connect the second exhaust gas guide element 44 to the first exhaust gas guide element 40, in the region of a second outlet opening 84, the second exhaust gas guide element 44 adjoins a seventh exhaust gas guide element 86, which in the present embodiment is configured as a hopper and which, at its downstream end, adjoins the first exhaust gas guide element 40, so that the part of the exhaust gas stream A, entering the exhaust gas treatment arrangement 12 at the exhaust gas inlet 32 and conducted through the first exhaust gas flow path 42, can flow to the first exhaust gas guide element 40 via the hopper-like seventh exhaust gas guide element 86 which is connected thereto, or also to the second exhaust gas guide element 44, in the region of the partition wall 30.

It is pointed out that also the connection of the individually mutually adjoining exhaust gas guide elements, which are preferably all made of sheet metal material, may be achieved by material bonding, for example welding or soldering, and/or by form fit, for example by flanging, or insertion of the exhaust gas guide elements into one another. Each of the exhaust gas guide elements is for example made of one piece, but alternatively may be made of several pieces. For example, the third exhaust gas guide element 54 and the fourth exhaust gas guide element 62 may also be component portions of one and the same component.

With the structure of an exhaust gas treatment arrangement 12 described above, it is possible, by corresponding activation of the flow path switching unit 36, to set the division of the exhaust gas stream A over the two exhaust gas flow paths 42, 50 in defined fashion. For example, if the entire exhaust gas stream A should be conducted through the second exhaust gas flow path 50 and hence through the SCR catalyst arrangement 68, the throttle valve 38 is set to its closed position in which it blocks the first exhaust gas flow path 42 substantially completely against through-flow in the region of the first exhaust gas guide element 40. The exhaust gas stream A is then conducted substantially completely into the second exhaust gas guide element 44 in the flow path separating region 48, and conducted through the mixing line formed in the third exhaust gas guide element 54. In this mixing line, the exhaust gas may be mixed with a reactant R and flow into the then following fourth exhaust gas element 62, on to the fifth exhaust gas guide element 64 and via this into the sixth exhaust gas guide element 66 or the SCR catalyst arrangement 68.

It is known that between the mixing line, which is formed or begun in the third exhaust gas guide element 54, and the SCR catalyst arrangement 68, a comparatively long flow path is provided for the mixture of exhaust gas and reactant R, in which the mixture is deflected repeatedly; this indeed leads to an increased flow resistance, but supports the mixing of the exhaust gas and reactant R. The exhaust gas flowing through the SCR catalyst arrangement 68 enters the flow path merging region formed in the exhaust gas stream merging element 74 and, via this and the exhaust gas outlet 34, leaves the exhaust gas treatment arrangement 12 for the then following part of the exhaust gas system 10, for example the further exhaust gas treatment system 80. Since in this operating state, the second volume region 28 is closed by the throttle valve 38, substantially no exhaust gas emerging from the SCR catalyst arrangement 68 passes through the passage openings 76 into the second volume region 28.

Figure 2:
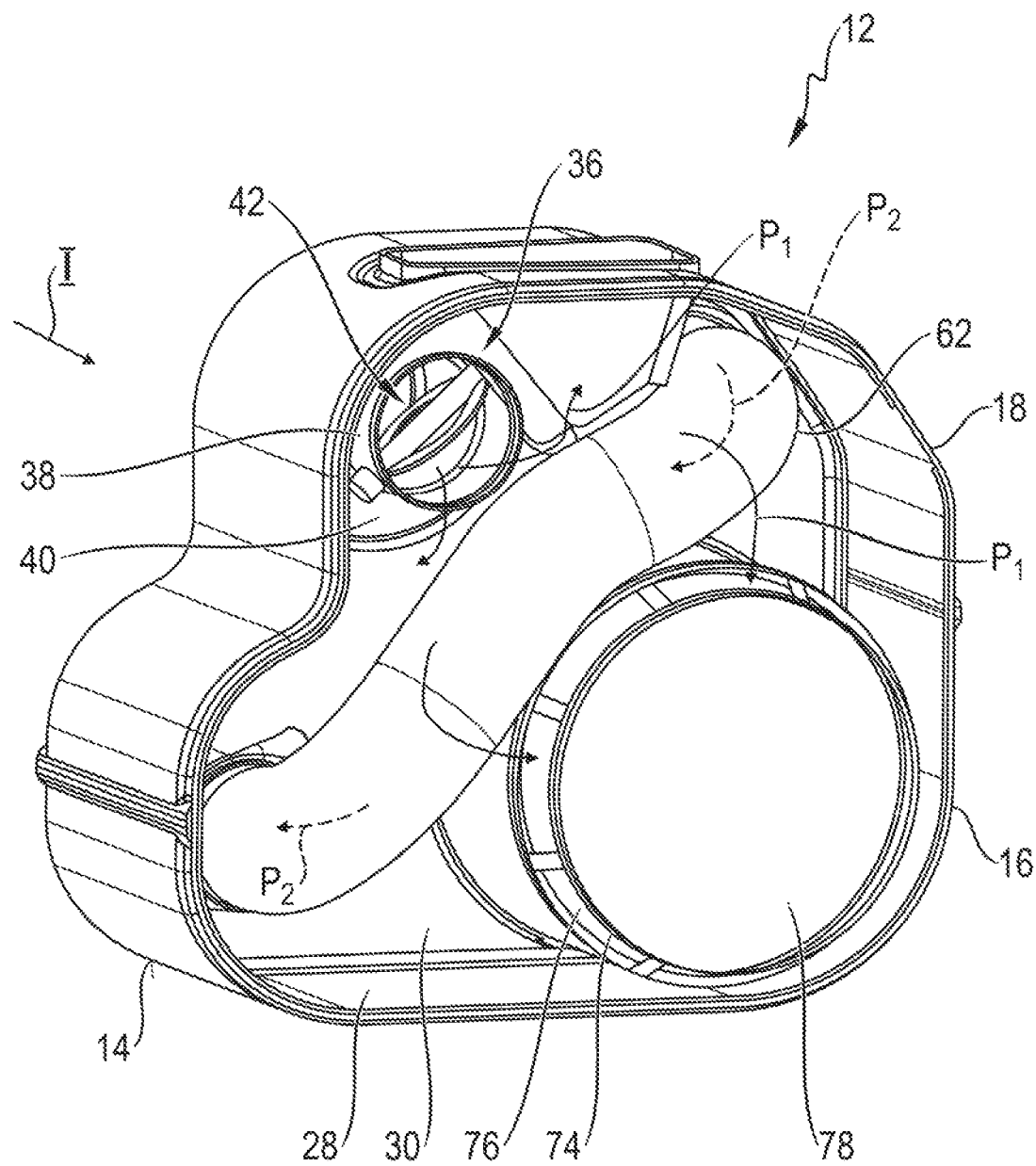
FIG. 2 is the exhaust gas treatment arrangement from FIG. 1 considered in viewing direction II.
Figure 4:
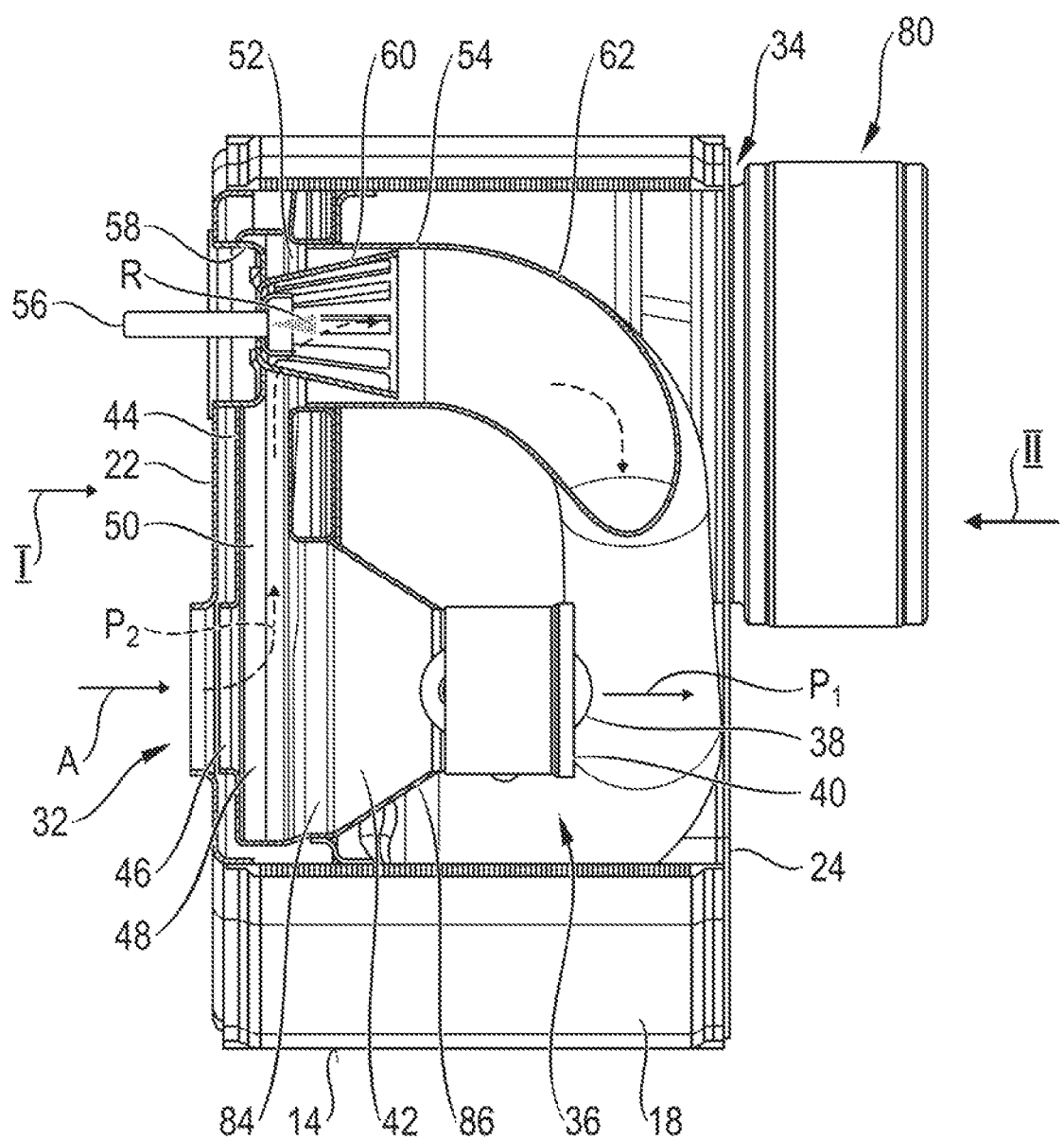
FIG. 4 is a longitudinal sectional view of the exhaust gas treatment arrangement; and, FIG. 5 is an illustration corresponding to FIG. 4, cut through a different section plane.
Figure 5:
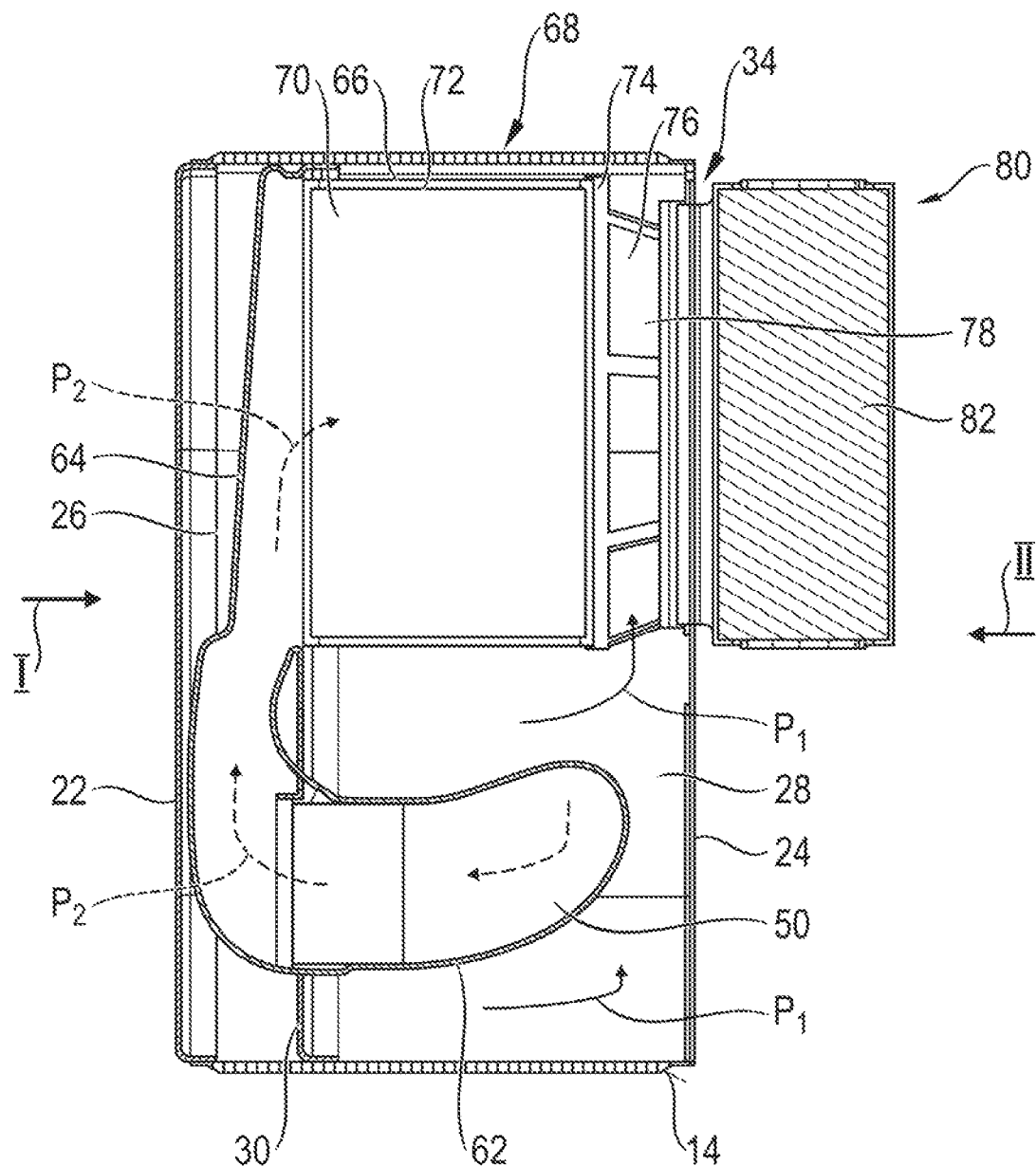

If the exhaust gas stream A is to be conducted substantially completely through the first exhaust gas flow path 42, the throttle valve 38 is set into its open position shown in FIGS. 2 and 4. In this state, the first exhaust gas guide element 40 is maximally opened for through-flow, and the exhaust gas stream A entering the housing 14 through the exhaust gas inlet 32 passes substantially completely rectilinearly through the inlet opening 46 of the second exhaust gas guide element 44 into the seventh exhaust gas guide element 86, the first exhaust gas guide element 40 and the second volume region 28. Since the inlet opening 46, the seventh exhaust gas guide element 86 and the first exhaust gas guide element 40 are arranged following one another substantially in a straight line in the flow direction, with this flow guidance comparatively low flow resistance for the exhaust gas stream A is achieved.

After it has emerged from the first exhaust gas guide element 40, the exhaust gas flows through the second volume region 28 and thus flows around the outsides of the third exhaust gas guide element 54 and the fourth exhaust gas guide element 62, and also the sixth exhaust gas guide element 66 and hence the SCR catalyst arrangement 68. This means that the exhaust gas entering the second volume region 28 with a comparatively high temperature heats the components or system regions assigned to second exhaust gas flow path 50. As a result, in the region of the introduction of the reactant R into the exhaust gas stream when flowing through the second exhaust gas flow path 50, the evaporation of the reactant R is supported. At the same time, by flowing around the sixth exhaust gas guide element 66 or SCR catalyst arrangement 68, this is also heated primarily from the outside and thus rapidly reaches a temperature necessary for performance of the catalytic reaction, or is reliably held at a high temperature during combustion operation of an internal combustion engine.

The exhaust gas flowing through the second volume region 28 then, in the region of the passage openings 76, enters the flow path merging region 78 formed in the exhaust gas stream merging element 74, and leaves this or the exhaust gas treatment arrangement 12 via the exhaust gas outlet 34.

Although in the operating state described above with maximally open throttle valve 38, the second exhaust gas flow path 50 is in principle not blocked against through-flow, because of the significantly lower flow resistance of the first exhaust gas flow path 42, the exhaust gas will flow primarily or substantially exclusively through the first exhaust gas flow path 42. In particular, the comparatively long second exhaust gas flow path 50 with multiple curves, and the catalyst element 70 of the SCR catalyst arrangement 68 arranged therein and through which the exhaust gas flows, ensure that the second exhaust gas flow path 50 provides a comparatively high flow resistance and hence the state may be reached in which, when the throttle valve 38 is fully open, the exhaust gas stream A is conducted substantially completely through the first exhaust gas flow path 42.

Because of the possibility of being able to switch between the two operating states explained above, with maximally open throttle valve 38 and maximally closed throttle valve 38, it is possible to conduct the exhaust gas through the SCR catalyst arrangement 68 or bypass this, depending on the need for carrying out a catalytic reaction therein. If for example, with a comparatively high exhaust gas temperature, it is not necessary to carry out a selective catalytic reduction, the injection of reactant R may be omitted and the exhaust gas stream A may be conducted through the first exhaust gas flow path 42 which offers the lower flow resistance, wherein this in turn contributes to a reduced fuel consumption in operation of an internal combustion engine.

If for example, with a comparatively low exhaust gas temperature or high nitrogen oxide content in the exhaust gas, it is necessary to perform a selective catalytic reduction, the exhaust gas stream A may be conducted substantially completely through the second exhaust gas flow path 50 and hence through the SCR catalyst arrangement 68. This may be necessary in particular if, at the start of working mode, an internal combustion engine emits exhaust gas with a comparatively low temperature and high pollutant content. In order in this state also to achieve as rapid as possible a heating of the SCR catalyst arrangement 68, initially the or at least a part of the exhaust gas stream A may be conducted through the first exhaust gas flow path 42, in order to transfer part of the heat transported therein to the SCR catalyst arrangement 68, around which exhaust gas flows in the second volume region 28. In this phase also, for example, a part of the exhaust gas stream A may already be conducted through the SCR catalyst arrangement 68, in order to also heat this from the inside. Here for example, the part of the exhaust gas stream A conducted through the second exhaust gas flow path 50 may be gradually increased, and when the SCR catalyst arrangement reaches a sufficiently high temperature, the injection of reactant R may begin in order then to start the selective catalytic reduction.

With the exhaust gas treatment arrangement structure according to the disclosure, a compact system region of an exhaust gas system is provided, which can be combined with a further system region serving for exhaust gas treatment in order to reduce the pollutant content, so as to operate an SCR catalyst arrangement, depending on operating mode, only when this is actually necessary or desirable in order to reduce the nitrogen oxide content. In other operating states, the SCR catalyst arrangement may be bypassed so that, firstly, reactant necessary for performance of the selective catalytic reduction may be saved, and secondly, because of the lower flow resistance in this operating state, an internal combustion engine can be operated with lower fuel consumption and hence lower pollutant emissions.

It is understood that the foregoing description is that of the preferred embodiments of the invention and that various changes and modifications may be made thereto without departing from the spirit and scope of the invention as defined in the appended claims.

What is claimed is:

1. An exhaust gas treatment arrangement for an exhaust gas system of an internal combustion engine, the exhaust gas treatment arrangement comprising:
    a housing defining an exhaust gas inlet for receiving an exhaust gas stream (A) of stream parts flowing therethrough and further defining an exhaust gas outlet;
    a first exhaust gas flow path leading from said exhaust gas inlet to said exhaust gas outlet;
    a second exhaust gas flow path leading from said exhaust gas inlet to said exhaust gas outlet separately from said first exhaust gas flow path;
    a flow path switching unit for changing the parts of said exhaust gas stream (A) conducted in said first exhaust gas flow path and in said second exhaust gas flow path;
    a reactant supply device for supplying reactant into said second exhaust gas flow path downstream of said exhaust gas inlet;
    an SCR catalyst arrangement in said second exhaust gas flow path upstream of said exhaust gas outlet;
    wherein:
    said housing has an interior partitioned by a partition wall into a first volume region and a second volume region;
    said second volume region forms at least a part of said first exhaust gas flow path; and,
    said SCR catalyst arrangement is substantially arranged in said second volume region.

2. The exhaust gas treatment arrangement of claim 1, wherein said first exhaust gas flow path and said second exhaust gas flow path conjointly define a flow path merging region upstream of said exhaust gas outlet; and, said SCR catalyst arrangement is mounted in said second exhaust gas flow path upstream of said flow path merging region.

3. The exhaust gas treatment arrangement of claim 1, wherein said first exhaust gas flow path and said second exhaust gas flow path conjointly define a flow path separation region downstream of said exhaust gas inlet whereat said first exhaust gas flow path and said second exhaust gas flow path separate from each other; and, said flow path switching unit is mounted downstream of said flow path separation region in said first exhaust gas flow path.

4. The exhaust gas treatment arrangement of claim 1, wherein said flow path switching unit includes a throttle valve movable between a closed position wherein said throttle valve maximally blocks said first exhaust gas flow path against through flow and an open position wherein said throttle valve maximally opens said first exhaust gas flow path for through flow.

5. The exhaust gas treatment arrangement of claim 1, wherein a flow resistance of said first exhaust gas flow path is less than a flow resistance of said second exhaust gas flow path.

6. The exhaust gas treatment arrangement of claim 1, wherein at least one of the following applies:
  a) said first exhaust gas flow path includes a first exhaust gas guide element open toward said second volume region; and,
  b) a segment of said first exhaust gas flow path leads from said exhaust gas inlet to said second volume region so as to permit exhaust gas to flow substantially linearly through said segment.

7. The exhaust gas treatment arrangement of claim 6, wherein said first exhaust gas guide element has a tubular configuration.

8. The exhaust gas treatment arrangement of claim 6, wherein said flow path switching unit includes a throttle valve movable between a closed position wherein said throttle valve maximally blocks said first exhaust gas flow path against through flow and an open position wherein said throttle valve maximally opens said first exhaust gas flow path for through flow; and, said throttle valve is mounted in said first exhaust gas guide element.

9. The exhaust gas treatment arrangement of claim 1, wherein said second exhaust gas flow path includes:
  a second exhaust gas guide element arranged substantially in said first volume region;
  an exhaust gas/reactant mixing segment connected to said second exhaust gas guide element;
  a third exhaust gas guide element connected to said second exhaust gas guide element;
  a mixer arranged in said third exhaust gas guide element;
  a fourth exhaust gas guide element connected to said third exhaust gas guide element and extending substantially in said second volume region;
  a fifth exhaust gas guide element connected to said fourth exhaust gas guide element and extending substantially into said first volume region;
  a sixth exhaust gas guide element connected to said fifth exhaust gas guide element and extending substantially into said second volume region; and,
  a catalyst element of said SCR catalyst arrangement being contained in said sixth exhaust gas guide element.

10. The exhaust gas treatment arrangement of claim 9, wherein at least one of the following applies:
  a) said exhaust gas inlet is provided on said second exhaust gas guide element;
  b) said second exhaust gas guide element is carried on said partition wall in a connecting region connected to said third exhaust gas guide element;
  c) said third exhaust gas guide element extends substantially into said second volume region; and,
  d) said second exhaust gas guide element defines a main exhaust gas flow direction which is substantially orthogonal to a main exhaust gas flow direction in said exhaust gas inlet.

11. The exhaust gas treatment arrangement of claim 9, wherein at least one of the following applies:
  a) said second exhaust gas flow path is not open to said first volume region; and,
  b) said second exhaust gas guide element and said fifth exhaust gas guide element are mutually adjacent in said first volume region and said second exhaust gas guide element defines a main exhaust gas flow direction which is approximately parallel to a main exhaust gas flow in said fifth exhaust gas guide element.

12. The exhaust gas treatment arrangement of claim 9, wherein said first exhaust gas flow path includes a hopper-shaped seventh exhaust gas guide element connected to said second exhaust gas guide element and leading to a first exhaust gas guide element of said first exhaust gas flow path, said first exhaust gas guide element being open toward said second volume region.

13. The exhaust gas treatment arrangement of claim 12, wherein:
  said second exhaust gas guide element has a first outlet opening;
  said third exhaust gas guide element is connected to said second exhaust gas guide element in a region of said first outlet opening;
  said second exhaust gas guide element has a second outlet opening; and,
  said seventh exhaust gas guide element is connected to said second exhaust gas guide element in a region of said second outlet opening.

14. The exhaust gas treatment arrangement of claim 9, wherein said first exhaust gas flow path and said second exhaust gas flow path conjointly define a flow path merging region upstream of said exhaust gas outlet; and, said flow path merging region includes an exhaust gas stream merging element following said sixth exhaust gas guide element; and wherein at least one of the following applies:
  a) said exhaust gas stream merging element is open to said second volume region via at least one passage opening; and,
  b) said exhaust gas outlet is provided in a region of said exhaust gas stream merging element.

15. The exhaust gas treatment arrangement of claim 9, wherein said second exhaust gas guide element and said fifth exhaust gas guide element each have a housing-like configuration.

16. An exhaust gas system for an internal combustion engine in a vehicle, the exhaust gas system comprising:
  an exhaust gas treatment arrangement including a housing defining an exhaust gas inlet for receiving an exhaust gas stream (A) of stream parts flowing therethrough and further defining an exhaust gas outlet; a first exhaust gas flow path leading from said exhaust gas inlet to said exhaust gas outlet; a second exhaust gas flow path leading from said exhaust gas inlet to said exhaust gas outlet separately from said first exhaust gas flow path; a flow path switching unit for changing the parts of said exhaust gas stream (A) conducted in said first exhaust gas flow path and in said second exhaust gas flow path; a reactant supply device for supplying reactant into said second exhaust gas flow path downstream of said exhaust gas inlet; and, an SCR catalyst arrangement in said second exhaust gas flow path upstream of said exhaust gas outlet;
  an exhaust gas treatment system connected to said exhaust gas outlet of said exhaust gas treatment arrangement;
  said exhaust gas treatment system including at least one exhaust gas treatment unit;
  wherein:
  said housing has an interior partitioned by a partition wall into a first volume region and a second volume region;
  said second volume region forms at least a part of said first exhaust gas flow path; and,
  said SCR catalyst arrangement is substantially arranged in said second volume region.

17. The exhaust gas system of claim 16, wherein said at least one exhaust gas treatment unit is a catalytic converter.

18. An exhaust gas treatment arrangement for an exhaust gas system of an internal combustion engine, the exhaust gas treatment arrangement comprising:
- a housing defining an exhaust gas inlet for receiving an exhaust gas stream (A) of stream parts flowing therethrough and further defining an exhaust gas outlet;
- a first exhaust gas flow path leading from said exhaust gas inlet to said exhaust gas outlet;
- a second exhaust gas flow path leading from said exhaust gas inlet to said exhaust gas outlet separately from said first exhaust gas flow path;
- a flow path switching unit for changing the parts of said exhaust gas stream (A) conducted in said first exhaust gas flow path and in said 5 second exhaust gas flow path;
- a reactant supply device for supplying reactant into said second exhaust gas flow path downstream of said exhaust gas inlet;
- an SCR catalyst arrangement in said second exhaust gas flow path upstream of said exhaust gas outlet;

wherein:
said housing has an interior partitioned by a partition wall into a first volume region and a second volume region;
said second volume region forms at least a part of said first exhaust gas flow path;
said second exhaust gas flow path includes:
- a second exhaust gas guide element arranged substantially in said first volume region;
- an exhaust gas/reactant mixing segment connected to said second exhaust gas guide element;
- a third exhaust gas guide element connected to said second exhaust gas guide element;
- a mixer arranged in said third exhaust gas guide element;
- a fourth exhaust gas guide element connected to said third exhaust gas guide element and extending substantially in said second volume region;
- a fifth exhaust gas guide element connected to said fourth exhaust gas guide element and extending substantially into said first volume region;
- a sixth exhaust gas guide element connected to said fifth exhaust gas guide element and extending substantially into said second volume region; and,
- a catalyst element of said SCR catalyst arrangement being contained in said sixth exhaust gas guide element.

19. An exhaust gas system for an internal combustion engine in a vehicle, the exhaust gas system comprising:
- an exhaust gas treatment arrangement including a housing defining an exhaust gas inlet for receiving an exhaust gas stream (A) of stream parts flowing therethrough and further defining an exhaust gas outlet; a first exhaust gas flow path leading from said exhaust gas inlet to said exhaust gas outlet; a second exhaust gas flow path leading from said exhaust gas inlet to said exhaust gas outlet separately from said first exhaust gas flow path; a flow path switching unit for changing the parts of said exhaust gas stream (A) conducted in said first exhaust gas flow path and in said second exhaust gas flow path; a reactant supply device for supplying reactant into said second exhaust gas flow path downstream of said exhaust gas inlet; and, an SCR catalyst arrangement in said second exhaust gas flow path upstream of said exhaust gas outlet;
- an exhaust gas treatment system connected to said exhaust gas outlet of said exhaust gas treatment arrangement;
- said exhaust gas treatment system including at least one exhaust gas treatment unit;

wherein:
said housing has an interior partitioned by a partition wall into a first volume region and a second volume region;
said second volume region forms at least a part of said first exhaust gas flow path;
said second exhaust gas flow path includes:
- a second exhaust gas guide element arranged substantially in said first volume region;
- an exhaust gas/reactant mixing segment connected to said second exhaust gas guide element;
- a third exhaust gas guide element connected to said second exhaust gas guide element;
- a mixer arranged in said third exhaust gas guide element; a fourth exhaust gas guide element connected to said third exhaust gas guide element and extending substantially in said second volume region;
- a fifth exhaust gas guide element connected to said fourth exhaust gas guide element and extending substantially into said first volume region;
- a sixth exhaust gas guide element connected to said fifth exhaust gas guide element and extending substantially into said second volume region; and,
- a catalyst element of said SCR catalyst arrangement being contained in said sixth exhaust gas guide element.

* * * * *

UNITED STATES PATENT AND TRADEMARK OFFICE
CERTIFICATE OF CORRECTION

| | | |
|---|---|---|
| PATENT NO. | : 11,891,936 B2 | Page 1 of 1 |
| APPLICATION NO. | : 17/668162 | |
| DATED | : February 6, 2024 | |
| INVENTOR(S) | : Wolfgang Datz et al. | |

It is certified that error appears in the above-identified patent and that said Letters Patent is hereby corrected as shown below:

In the Claims

<u>In Column 13:</u>
Line 16: delete "5" before "second".

Signed and Sealed this
Fourth Day of June, 2024

Katherine Kelly Vidal
*Director of the United States Patent and Trademark Office*